(12) United States Patent
Kishimoto

(10) Patent No.: US 8,786,626 B2
(45) Date of Patent: Jul. 22, 2014

(54) COLOR PROCESSING DEVICE, COLOR PROCESSING METHOD, AND COMPUTER READABLE MEDIUM STORING PROGRAM

(75) Inventor: Yasunari Kishimoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 435 days.

(21) Appl. No.: 13/017,623

(22) Filed: Jan. 31, 2011

(65) Prior Publication Data

US 2012/0019843 A1    Jan. 26, 2012

(30) Foreign Application Priority Data

Jul. 21, 2010   (JP) ................................ 2010-163735

(51) Int. Cl.
| | |
|---|---|
| G09G 5/00 | (2006.01) |
| H04N 1/60 | (2006.01) |
| G03F 3/08 | (2006.01) |
| H04N 1/46 | (2006.01) |
| G06K 9/00 | (2006.01) |

(52) U.S. Cl.
USPC ............ 345/591; 358/1.9; 358/520; 358/528; 382/167

(58) Field of Classification Search
CPC .......... G06T 11/001; G09G 5/02; G09G 5/06; H04N 1/6058
USPC .................................. 358/520, 528; 382/167
See application file for complete search history.

(56) References Cited

U.S. PATENT DOCUMENTS

| | | | |
|---|---|---|---|
| 5,742,296 A * | 4/1998 | Yamada et al. ................ 345/604 |
| 6,719,392 B2 * | 4/2004 | Qiao .............................. 347/15 |
| 2009/0122372 A1 * | 5/2009 | Miyahara et al. ............. 358/520 |

FOREIGN PATENT DOCUMENTS

JP         B2-4137393         8/2008

* cited by examiner

Primary Examiner — James A Thompson
Assistant Examiner — Tapas Mazumder
(74) Attorney, Agent, or Firm — Oliff PLC

(57) ABSTRACT

A color processing device includes a calculating unit that calculates hues in a device-dependent color space and hues in a device-independent color space of plural reproduction colors that are positioned on an input color gamut boundary and that have different hues, a deriving unit that calculates hues of corresponding colors in which a change in at least one of lightness and chrome caused by color gamut mapping performed in the device-independent color space is smaller than a change caused by the color gamut mapping performed on the reproduction colors, thereby deriving a correspondence between the hues in the device-dependent color space and the hues of the corresponding colors in the device-independent color space, a hue correcting unit that calculates hues in the device-dependent color space from input colors, thereby correcting the input colors, and a color gamut mapping unit that performs the color gamut mapping.

11 Claims, 9 Drawing Sheets

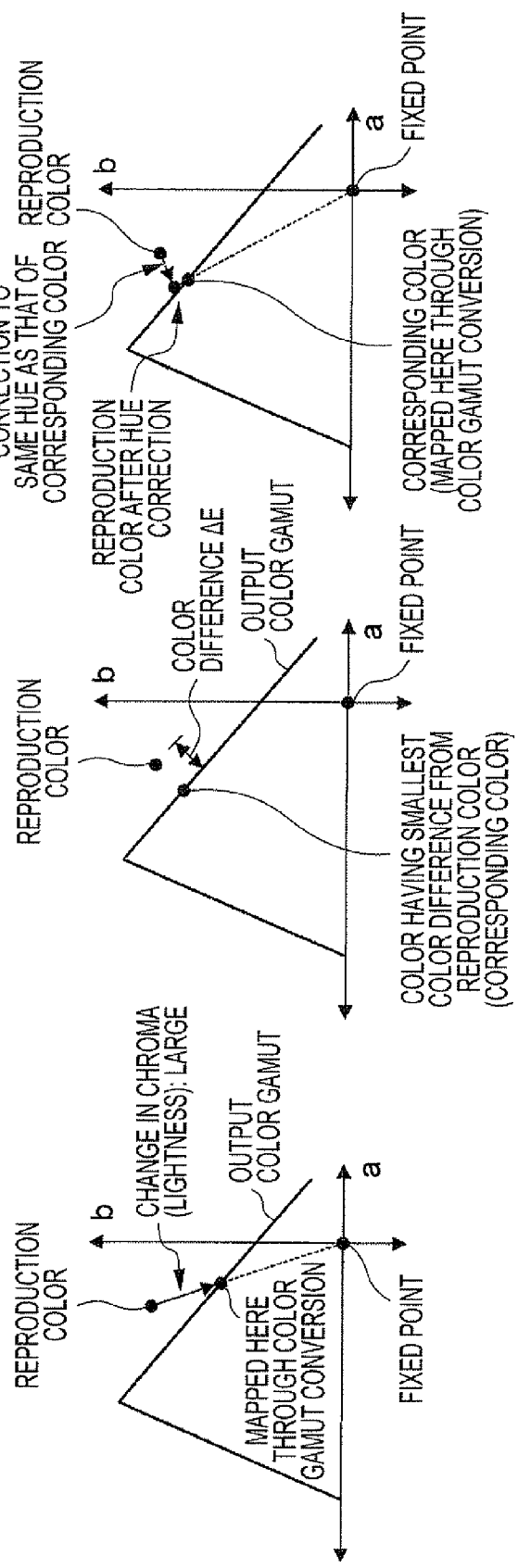

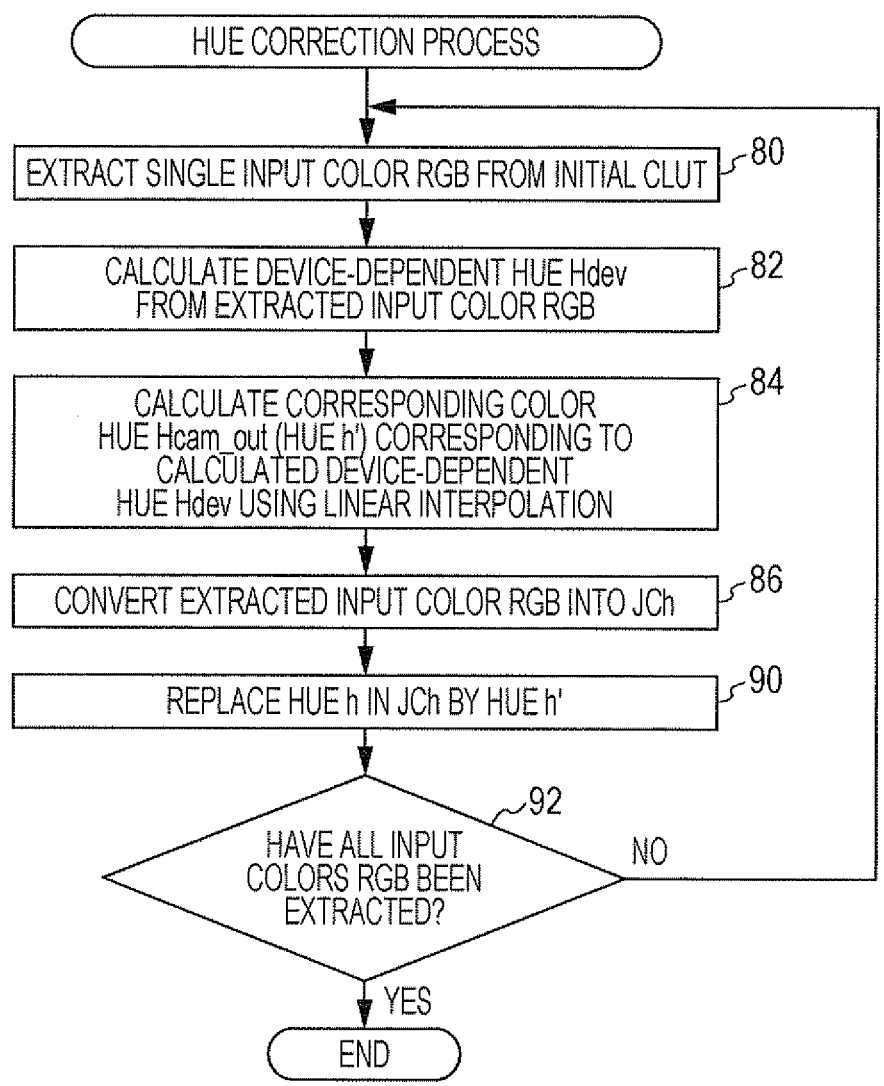

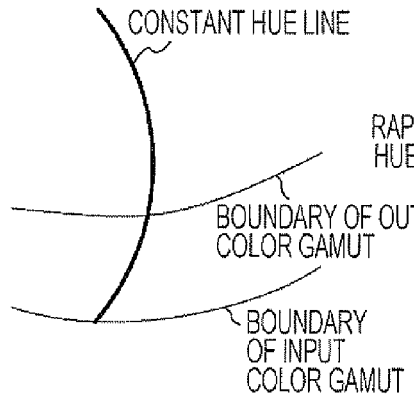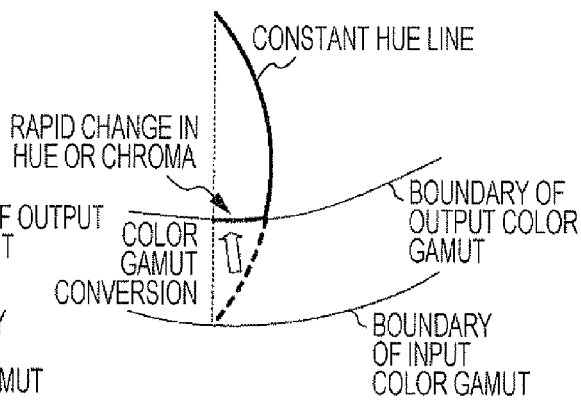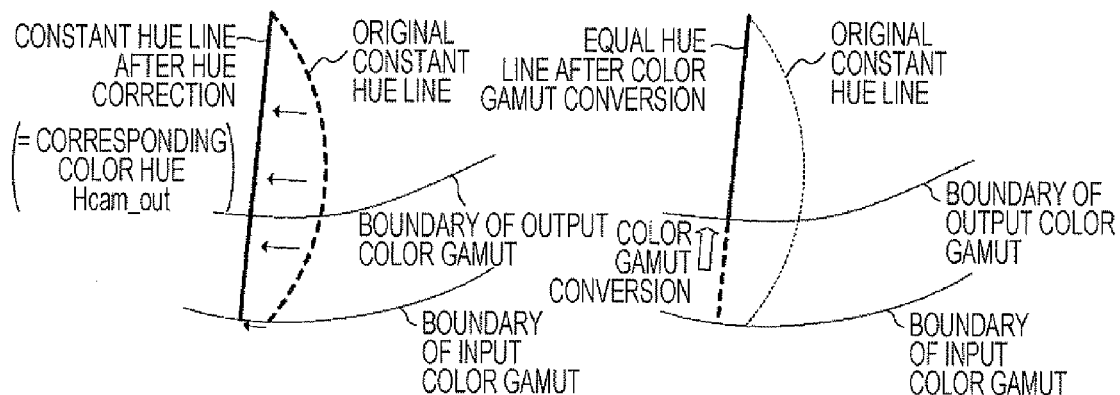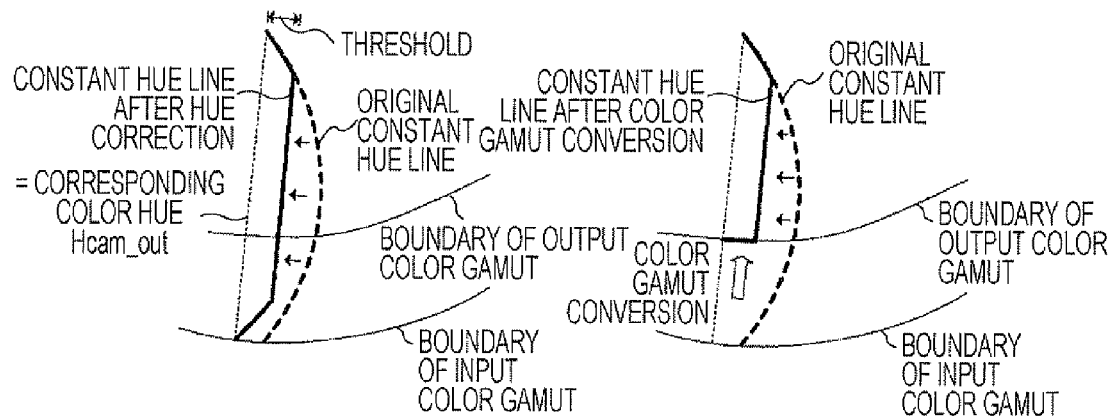

COLOR PROCESSING DEVICE, COLOR PROCESSING METHOD, AND COMPUTER READABLE MEDIUM STORING PROGRAM

CROSS-REFERENCE TO RELATED APPLICATIONS

This application is based on and claims priority under 35 USC 119 from Japanese Patent Application No. 2010-163735 filed Jul. 21, 2010.

BACKGROUND (i) Technical Field

The present invention relates to a color processing device, a color processing method, and a computer readable medium storing a program.

(ii) Related Art

Image input/output devices, such as a color printer, monitor, printing machine, and scanner, have different color reproduction characteristics for a color gamut and the like. Thus, in the case of transmitting/receiving colors between devices, it is necessary to achieve matching of color reproduction by correcting differences in color reproduction characteristics of the individual devices by performing color processing in a device-independent color space, the color processing including color gamut mapping in which colors in an input-side device are associated with colors in an output-side device.

SUMMARY

According to an aspect of the invention, there is provided a color processing device including: a calculating unit that calculates hues in a device-dependent color space and hues in a device-independent color space of plural reproduction colors that are positioned on an input color gamut boundary and that have different hues; a deriving unit that calculates, on the basis of the hues in the device-independent color space calculated by the calculating unit, individual hues of corresponding colors in which a change in at least one of lightness and chroma caused by color gamut mapping performed in the device-independent color space is smaller than a change caused by the color gamut mapping performed on the reproduction colors, the calculation being performed on the plural reproduction colors, thereby deriving a correspondence between the hues in the device-dependent color space and the hues of the corresponding colors in the device-independent color space; a hue correcting unit that calculates hues in the device-dependent color space from input colors, thereby correcting the input colors so that hues in the device-independent color space of the input colors become similar to the hues of the corresponding colors in the device-independent color space corresponding to the hues in the device-dependent color space of the input colors obtained on the basis of the correspondence derived by the deriving unit; and a color gamut mapping unit that performs the color gamut mapping in which the input colors corrected by the hue correcting unit are mapped into an output color gamut in the device-independent color space.

BRIEF DESCRIPTION OF THE DRAWINGS

Exemplary embodiments of the present invention will be described in detail based on the following figures, wherein:

FIGS. 5A to 5C are schematic diagrams for describing calculation of a corresponding color hue Hcam_out in a hue control table generation process;

FIG. 6 is a flowchart illustrating a hue correction process according to the first exemplary embodiment;

FIGS. 8A to 8F are image diagrams for describing a hue correction process; and

DETAILED DESCRIPTION

Hereinafter, exemplary embodiments of the present invention will be described in detail with reference to the attached drawings. In the exemplary embodiments, a detailed description will be given of a device link profile (generation of a color profile for converting the colors of a first device into the colors of a second device) defined in the International Color Consortium (ICC) standard, but the embodiments of the present invention are not limited thereto, and may also be applied to an output profile (generation of a color profile of a second device from a defined profile connection space (PCS)) or a color conversion profile.

First Exemplary Embodiment

Figure 1:
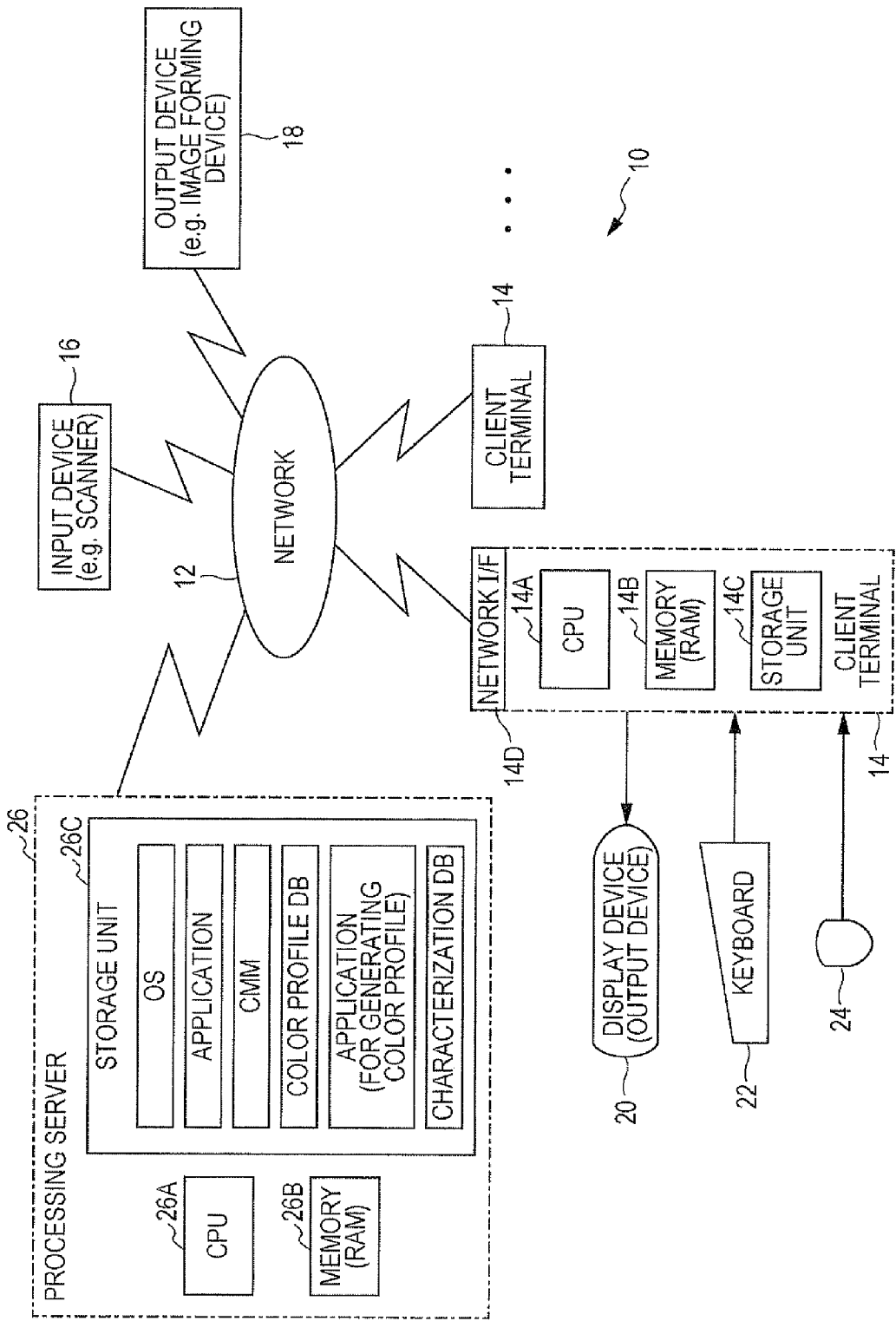
FIG. 1 is a block diagram illustrating a schematic configuration of a computer system according to a first exemplary embodiment of the present invention.

FIG. 1 illustrates a schematic configuration of a computer system 10 according to a first exemplary embodiment. The computer system 10 includes plural client terminals 14 such as personal computers (PCs), an input device 16 for inputting image data, an output device 18 for making input image data visible as an image, and a processing server 26 for converting the colors of input image data into colors for an output device using a color profile for the output device, which are connected to a network 12 such as a local area network (LAN).

An example of the input device 16 may be a scanner that reads a document and outputs image data. An example of the output device 18 may be an image forming device that prints an image representing input image data onto a sheet (e.g., a printer or a multifunction peripheral having functions of a copying machine and a facsimile machine in addition to a printer). Also, the network 12 may be connected to a computer network such as the Internet.

Each of the client terminals 14 is provided with a central processing unit (CPU) 14A, a memory 14B such as a random access memory (RAM), a nonvolatile storage unit 14C such as a hard disk drive (HDD) or a flash memory, and a network interface (I/F) 14D, and is connected to the network 12 via the network I/F 14D. Also, the client terminal 14 is connected to a display device 20 serving as an output device and to a keyboard 22 and a mouse 24 serving as an input unit. Alternatively, the input device 16 such as a scanner and the output device 18 such as an image forming device may be directly connected to the client terminal 14, like the display device 20. For example, when a digital still camera is used as the input device 16 instead of a scanner, the digital still camera may be directly connected to the client terminal 14.

The processing server 26 includes a CPU 26A, a memory 26B, and a storage unit 26C. The storage unit 26C of the processing server 26 is pre-installed with a program of a server operating system (OS), various types of application programs that operate in the server OS and that enable use of the input device 16 and the output device 18, and a color management module (CMM) used for performing a color conversion process (described below) in the processing server 26. Furthermore, the storage unit 26C is pre-installed with a color profile database (DB) in which a color profile or the like to be used in a color conversion process may be registered, and an application program for generating a color profile. The characterization information used for generating the color profile includes colorimetry data, coverage data, and an ICC profile, and characterization databases storing those pieces of data are also stored in the storage unit 26C. Typically, colorimetry data is obtained by measuring the color of an output sample using a colorimeter, the output sample being printed by operating an output device from the processing server 26. Alternatively, the colorimetry data may be obtained from an ICC or European Color Initiative (ECI) server via a network.

Next, the operation of the first exemplary embodiment will be described. In a case where image data input through the input device 16 or image data used for outputting an image from the output device 18 is used for outputting an image from another device, it is difficult to compensate for a difference in the appearance of images if there is a difference in color gamut. For this reason, the processing server 26 according to the first exemplary embodiment is provided with a color profile generating unit and a color conversion unit illustrated in FIG. 2. The color profile generating unit generates a color profile reflecting the user's intensions (rendering intention, color reproduction mode, etc.), which have been classified in advance. The color conversion unit performs color conversion by setting a color profile in a color conversion processing unit.

Figure 2:
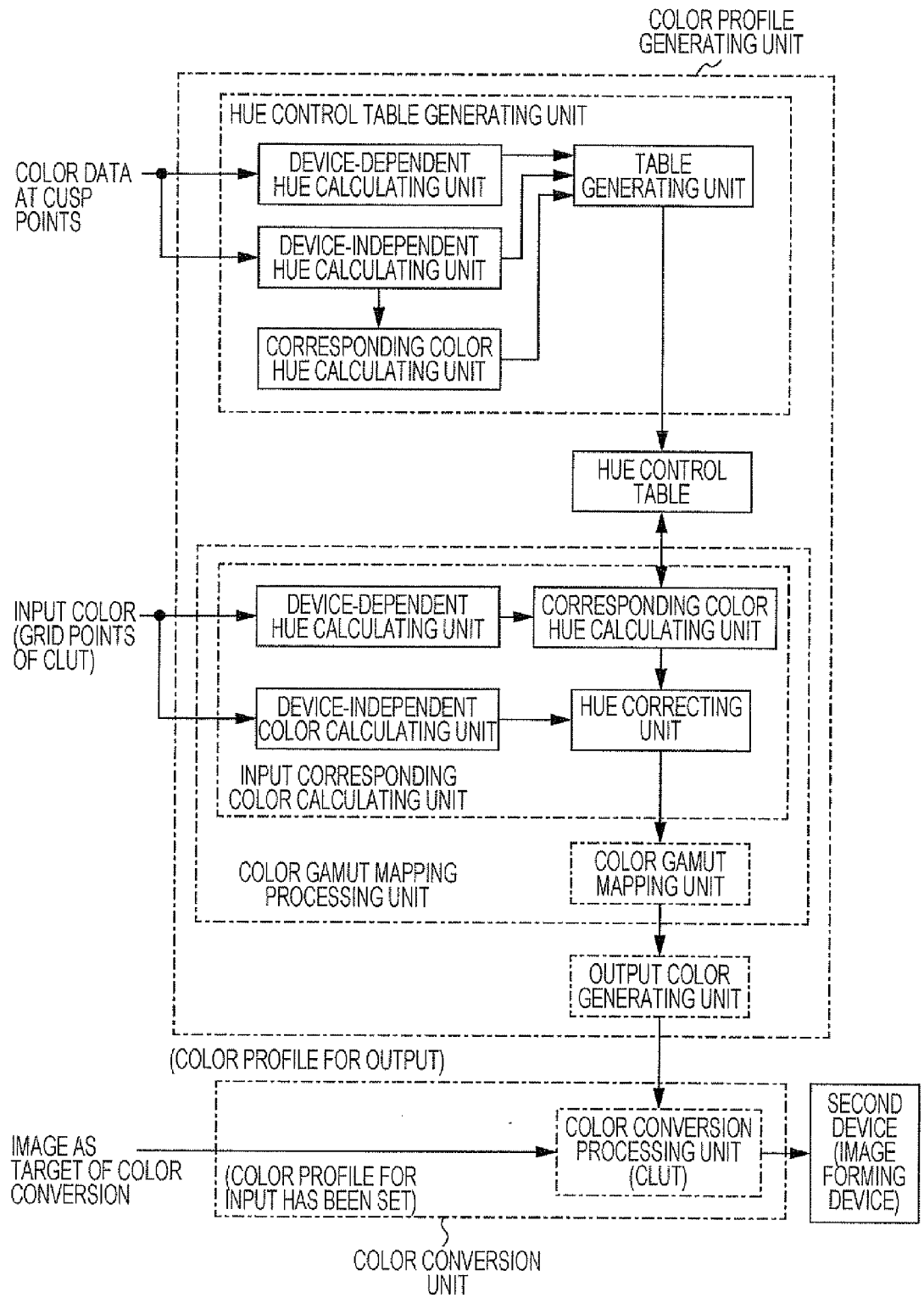
FIG. 2 is a schematic diagram of a color conversion processing unit according to the first exemplary embodiment.

As illustrated in FIG. 2, a raster image processor (RIP) that is provided with a typical color management module (CM) and that is capable of handing PostScript or the like may be used as the color conversion processing unit according to the first exemplary embodiment. Hereinafter, the color profile generating unit for generating an output color profile will be described. The color profile generating unit includes a color gamut mapping processing unit that obtains corresponding colors of the respective input colors of CIELAB (corresponding to lightness, chroma, and hue) serving as initial values of a color lookup table (CLUT), an output color generating unit that generates output colors that depend on an output device on the basis of the corresponding colors, and a hue control table generating unit that generates a hue control table that is referred to when the color gamut mapping processing unit performs mapping. Also, the color gamut mapping processing unit includes a color gamut mapping unit and an input corresponding color calculating unit that performs preprocessing for mapping, that is, changes the lightness, chroma, and hue of input colors as necessary. More specifically, the input corresponding color calculating unit includes a device-dependent hue calculating unit, a corresponding color hue calculating unit, a device-independent color calculating unit, and a hue correcting unit. The hue control table generating unit includes a device-dependent hue calculating unit, a device-independent hue calculating unit, a corresponding color hue calculating unit, and a table generating unit.

A color profile according to the ICC standard is made up of a gradation curve for correcting each single color (TRC, gamma correction, etc.) and a GLUT. Hereinafter, individual processes for generating a color profile will be described. In this exemplary embodiment, colors in a color space sRGB that depends on a specific device are used as input colors. Similarly to other color spaces, sRGB may be converted into CIEXYZ or CIELAB using an ICC profile. The input colors may be converted into color data of a color space appropriate for color gamut mapping. A color space representing color appearance that excludes the effect of viewing conditions is appropriately used as the color space. For example, color spaces JCh and Jab defined by the color appearance model CIECAM02 or a color space derived therefrom and is modified (completely adapted) may be more appropriate. Alternatively, the color appearance model CIECAM97s or the like may be used instead of the color appearance model CIECAM02.

The color profile generating unit regards the individual colors at many grid points that are set in a first device-dependent color space as input colors. Also, although the details will be described below, the color gamut mapping processing unit according to this exemplary embodiment also performs a hue correction process for correcting hues on the input colors with reference to the hue control table generated by the hue control table generating unit by using an output color gamut boundary, thereby generating input colors on which mapping is to be performed, and then performs color gamut mapping so that the colors obtained through a color gamut mapping process are within the color gamut of an output device. Here, the process "color gamut mapping" includes changing the hue and lightness of input colors. A difference in color gamut mainly corresponds to a difference in lightness and chroma, and thus color gamut mapping is an algorithm of a process for changing the lightness and chroma to those within an output color gamut.

In an output color generation method, calculation is performed with interpolation using colorimetry data (CIEXYZ, CIELAB, or the like) and coverage data (CMYK here), whereby CIELAB is converted into output colors of CMYK. In this case, a color prediction model using a known neural network or a statistic method may be used.

Figure 3:
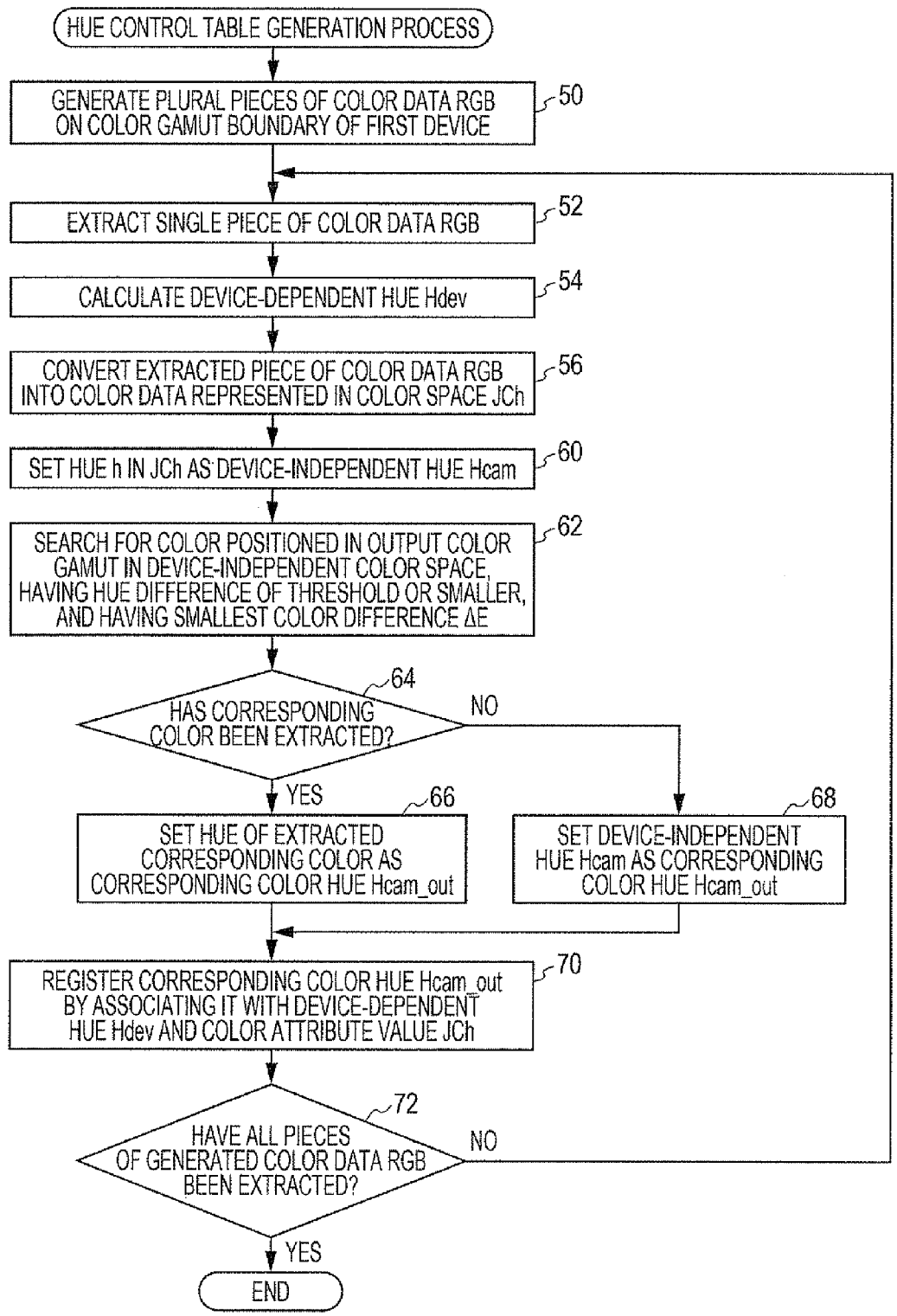
FIG. 3 is a flowchart illustrating a hue control table generation process.

Next, a hue control table generation process will be described with reference to FIG. 3. This hue control table generation process is an example of a process performed by the hue control table generating unit, and is performed prior to the execution of a hue correction process described below.

Figure 4:
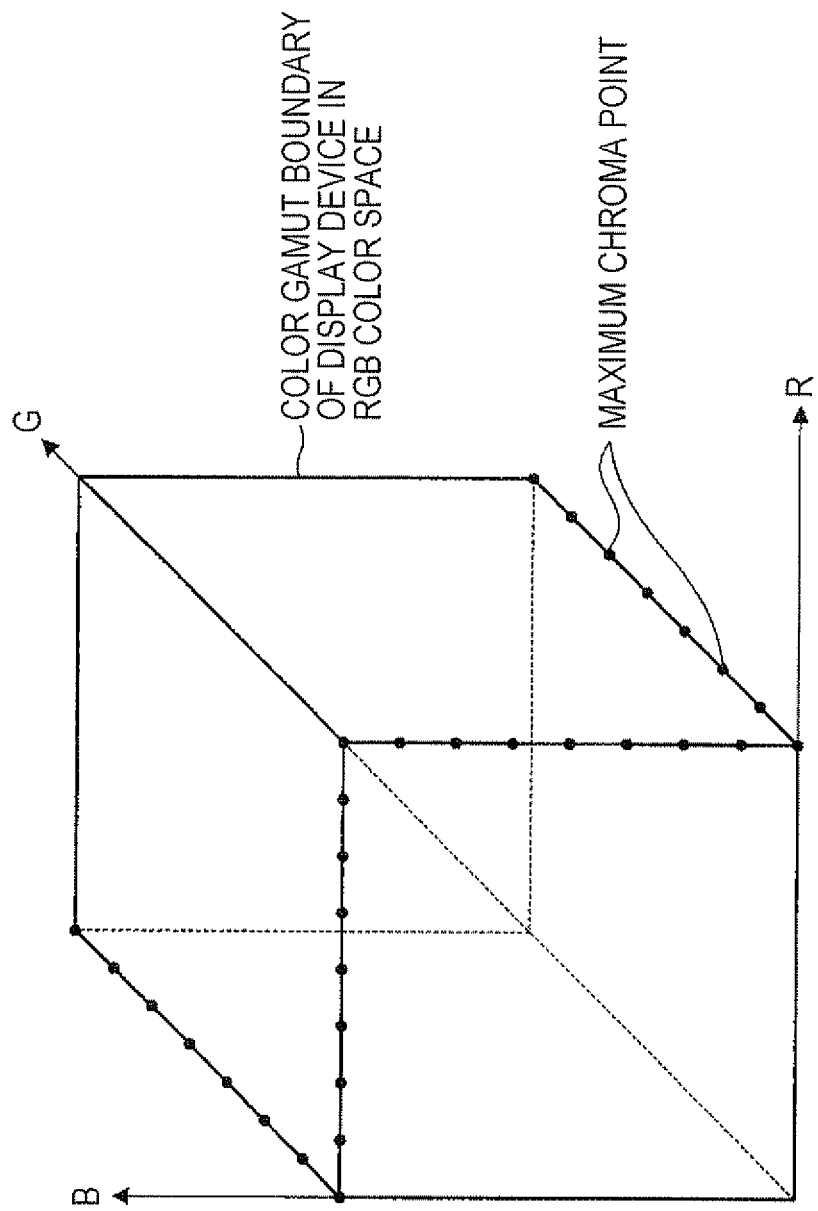
FIG. 4 is a schematic diagram for describing extraction of reproduction colors on a color gamut boundary of a first device.

In the hue control table generation process, plural pieces of color data RGB at substantially maximum chroma points (CUSP points), which are substantially positioned on a color gamut boundary of a first device in a first device-dependent color space and which have hues different from each other, are generated in step 50. For example, if the first device is the display device 20 and if the first device-dependent color space is an RGB color space (e.g., sRGB color space), the color gamut boundary of the first device (display device 20) in the first device-dependent color space forms a cubic shape as illustrated in FIG. 4 as an example, in which primary colors in the device-dependent color space are included as apexes. The maximum chroma points of respective hues exist at the apexes and on the sides of the cube representing the color gamut boundary of the device, as indicated with black points in FIG. 4. In step 50, the pieces of color data RGB at the respective points illustrated in FIG. 4 are selected as pieces of color data at the maximum chrome points of respective hues.

In FIG. 4, the maximum chroma points at which color data is generated are illustrated as points arranged at substantially regular intervals in the device-dependent color space. Alternatively, the intervals of the maximum chroma points at which color data is generated in the device-dependent color space may vary in accordance with hues. The maximum chrome points of the respective hues at which color data is generated in step 50 correspond to an example of reproduction colors according to an exemplary embodiment of the present invention.

In step 52, a single unprocessed piece of color data RGB is extracted as a processing target from among the plural pieces of color data of different hues generated in step 50. In step 54, a hue in a device-dependent color space as a processing target (device-dependent hue Hdev of a reproduction color as a processing target) is calculated on the basis of the piece of color data RGB as a processing target extracted in step 52. As for the device-dependent hue Hdev, a hue H in an HSV color space or an HLS color space that is known as a color space depending on an RGB color space or a CMY color space may be calculated, and the hue H may be applied as the device-dependent hue Hdev. For example, in the case of calculating the hue H in the HSV color space, if R, G, and B in the piece of color data RGB as a processing target have values ranging from a minimum value of 0.0 to a maximum value of 1.0, the hue H in the HSV color space of the reproduction color represented by the piece of color data RGB as a processing target may be calculated by substituting the piece of color data RGB as a processing target into the following equation (1).

$$H = \begin{cases} 60 \times \dfrac{G-B}{\max(R,G,B)-\min(R,G,B)} + 0 & \text{if } \max(R,G,B) = R \\ 60 \times \dfrac{B-R}{\max(R,G,B)-\min(R,G,B)} + 120 & \text{if } \max(R,G,B) = G \\ 60 \times \dfrac{R-G}{\max(R,G,B)-\min(R,G,B)} + 240 & \text{if } \max(R,G,B) = B \end{cases} \quad (1)$$

In the above equation (1), max( ) is an operator representing the maximum of the value in the parentheses, and min( ) is an operator representing the minimum of the value in the parentheses. Also, if max(R, G, B)=min(R, G, B) in the above equation (1), the hue H is incalculable, and thus the hue H=0. The calculation performed in step 54 is an example of a process for calculating a hue in a device-dependent color space for a certain reproduction color, and corresponds to the device-dependent hue calculating unit of the hue control table generating unit (see FIG. 2).

In step 56, the piece of color data RGB as a processing target that is extracted in step 52 is converted into color data represented in a color space JCh using a preset color conversion equation of sRGB or a calculation equation of the color appearance model CIECAM02.

In step 60, the hue H of the reproduction color JCh obtained through the calculation performed in step 56 is set as a hue in a device-independent color space (device-independent hue Hcam) of the reproduction color as a processing target. The calculation performed in steps 56 and 60 is an example of a process for calculating a hue in a device-independent color space for a certain reproduction color, and corresponds to the device-independent hue calculating unit of the hue control table generating unit (see FIG. 2). Also, steps 54 to 60 are an example of a process performed by a calculating unit according to an exemplary embodiment of the present invention.

Now, assume a case where the color gamut of an output device (output color gamut) is narrower than the color gamut of a virtual device (input color gamut) and has a boundary shape having a portion where the chroma at a boundary position sharply changes with respect to change in hue, as illustrated in FIG. 5A as an example. In this case, if color gamut mapping is performed to arrange the colors existing in the input color gamut within the output color gamut using fixed-point mapping, which is often used in color gamut mapping, a reproduction color at the vicinity of the portion where the chroma at a boundary position of the output color gamut sharply changes with respect to change in hue (e.g., the reproduction color illustrated in FIG. 5A) greatly changes in chroma (or lightness) in accordance with the color gamut mapping. However, as for such a reproduction color, change in chroma (or lightness) caused by color gamut mapping may be suppressed by correcting the hue before performing color gamut mapping, as illustrated in FIG. 5C as an example.

On the basis of the description given above, in step 62, information indicating the output color gamut stored in advance in the storage unit 14C is read therefrom. On the basis of the read information, a color that is in the output color gamut in the device-independent color space, that has a hue difference of a threshold or smaller with respect to the device-independent hue Hcam that is set in step 60 (the threshold is an example of the threshold described in the claims), and that has a minimum color difference ΔE is searched for. This color is an example of a corresponding color according to an embodiment of the present invention, and is hereinafter referred to as "corresponding color" (also see FIG. 5B). In addition, when a lightness difference is represented by ΔL, a chroma difference is represented by ΔC, and a hue difference is represented by Δh, the color difference ΔE defined by the following equation (2) or (3) may be used as a color difference ΔE.

$$\Delta E = \sqrt{(\Delta L^2 + \Delta C^2 + \Delta h^2)} \quad (2)$$

$$\Delta E = \sqrt{((w1 \cdot \Delta L)^2 + (w2 \cdot \Delta C)^2 + (w3 \cdot \Delta h)^2)} \quad (3)$$

Note that w1, w2, and w3 in equation (3) are weighting coefficients for the lightness difference ΔL, chroma difference ΔC, and hue difference Δh, respectively, and the values of the weighting coefficients w1, w2, and w3 may be set so that the weight for the hue difference Δh is smaller than the weight for the lightness difference ΔL or chrome difference ΔC.

The color difference ΔE defined by equation (2) is an example of the color difference described in the claims, equation (3) is an example of "an evaluation function correlated with the color difference" described in the claims, and the color difference ΔE defined by equation (3) is an example of "value of an evaluation function" described in the claims. The evaluation function is not limited to that based on equation (3), and another evaluation function may also be used. Also, the above-described search for a corresponding color may be realized using an algorithm of color gamut mapping.

In step 64, it is determined whether a corresponding color has been extracted through the search performed in step 62 or not. If a positive determination is made, the process proceeds to step 66, where the hue of the corresponding color extracted through the search performed in step 62 is calculated, and the calculated hue of the corresponding color is set as the hue in the device-independent color space (corresponding color hue Hcam_out) of the corresponding color corresponding to the reproduction color as a processing target. Then, the process proceeds to step 70. On the other hand, if a negative determination is made in step 64, the process proceeds to step 68, where the device-independent hue Hcam that is set in the foregoing step 60 is set as the corresponding color hue Hcam_out. Then, the process proceeds to step 70.

Alternatively, instead of setting the device-independent hue Hcam as the corresponding color hue Hcam_out, a color that is positioned in the output color gamut in the device-independent color space and that has the smallest color difference ΔE may be searched for without setting a limit of a hue difference from the device-independent hue Hcam, and a hue value obtained by changing the device-independent hue Hcam by the threshold in the direction where the hue difference from the color extracted through the search becomes small may be set as the corresponding color hue Hcam_out. The above-described steps 62 to 68 are an example of a process performed by the corresponding color hue calculating unit of the hue control table generating unit (see FIG. 2).

In step 70, the corresponding color hue Hcam_out that is set in step 66 or 68 is associated with the device-dependent hue Hdev calculated in step 54 and the color attribute value JCh calculated in step 56, and is registered in the hue control table stored in the memory 14B or the storage unit 14C. Step 70 is an example of a process performed by the table generating unit of the hue control table generating unit (see FIG. 2).

In step 72, it is determined whether all the pieces of color data generated in the foregoing step 50 have been extracted as a processing target. If a negative determination is made, the process returns to step 52, and steps 52 to 72 are repeated until a positive determination is made in step 72. Accordingly, the device-dependent hues Hdev, device-independent hues Hcam (color attribute values JCh), and corresponding color hues Hcam_out for all the pieces of color data generated in step 50 are calculated, and these values are registered in the hue control table while being associated with each other. Then, when a positive determination is made in step 72, the hue control table generation process ends.

The information registered in the hue control table in the above-described hue control table generation process indicates the correspondence between the device-dependent hues Hdev and the corresponding color hues Hcam_out. The hue control table generation process for registering the foregoing information in the hue control table is an example of a process performed by a deriving unit according to an exemplary embodiment of the present invention (more specifically, the deriving unit described in the claims).

Next, a hue correction process will be described with reference to FIG. 6.

In the hue correction process, in order to generate a CLUT of a color profile in a state where information has been registered in the hue control table through the above-described hue control table generation process, a single input color RGB is extracted as a processing target from an initial CLUT generated inside (e.g., color table of seventeen grid points of individual colors of RGB) in step 80.

In step 82, the input color RGB as a processing target extracted in step 80 is substituted into the foregoing equation (1), so that a hue H in the first device-dependent color space (device-dependent hue Hdev) of the color represented by the input color RGB as a processing target is calculated. The calculation performed in step 82 is an example of a step of "calculating hues in the device-dependent color space from input colors" performed by a hue correcting unit according to an exemplary embodiment of the present invention. Also, step 82 is an example of a process performed by the device-dependent hue calculating unit of the input corresponding color calculating unit (see FIG. 2).

In step 84, a corresponding color hue Hcam_out (hue h') corresponding to the device-dependent hue Hdev of the input color as a processing target obtained through the calculation performed in step 82 is calculated using linear interpolation on the basis of the correspondence between the device-dependent hue Hdev and the corresponding color hue Hcam_out indicated by the information registered in the hue control table. Specifically, the calculation of the hue h' is performed by selecting a pair of reproduction colors in which the device-dependent hue Hdev is similar to the device-dependent hue Hdev of the input color as a processing target calculated in step 82 from among plural reproduction colors the information of which is registered in the hue control table, and obtaining, using linear interpolation, a corresponding color hue Hcam_out corresponding to a virtual reproduction color having the same device-dependent hue Hdev as the input color as a processing target from a pair of corresponding color hues Hcam_out corresponding to the pair of reproduction colors on the basis of the ratio of the device-dependent hues Hdev of the input color as a processing target and the selected pair of reproduction colors.

If the foregoing calculation of the hue h' is a calculation in which a hue difference is handled as a distance in the device-independent color space, the chromas in the device-independent color space of the pair of reproduction colors selected from the hue control table may be calculated from the reproduction color JCh registered in the hue control table. Also, the chroma in the device-independent color space of a virtual reproduction color having the same device-dependent hue Hdev as that of the input color as a processing target may be obtained through linear interpolation and the chroma in the device-independent color space of the input color as a processing target may be calculated on the basis of the ratio of the device-dependent hues Hdev of the input color as a processing target and the selected pair of reproduction colors. Also, the amount of change in hue with respect to the hue in the device-independent color space of the input color as a processing target, which is obtained from the corresponding color hue Hcam_out corresponding to the virtual reproduction color, may be multiplied by a ratio of the chroma in the device-independent color space of the input color as a processing target with respect to the chroma in the device-independent color space of the virtual reproduction color. Accordingly, the amount of change in hue with respect to the hue in the device-independent color space of the input color as a processing target may be corrected in accordance with the chroma in the device-independent color space of the input color as a processing target.

The above-described correction of the amount of change in hue is an example of the process according to the claims. Note that the amount of correction for the amount of change in hue may be nonlinearly changed in accordance with the change in ratio of chroma, instead of being linearly changed in accordance with the ratio of chroma as described above. The foregoing step 84 corresponds to the corresponding color hue calculating unit of the color gamut mapping processing unit (see FIG. 2).

In step 86, the input color RGB as a processing target that is extracted in step 80 is converted into an input color JCh using a predetermined calculation equation (ICC profile or the like) and a CIECAM02 calculation equation (using standard viewing conditions of ICC). Step 86 is an example of a process performed by the device-independent color calculating unit of the color gamut mapping processing unit (see FIG. 2).

In step 90, the hue h of the input color JCh that is obtained through the calculation performed in step 86 is changed to (replaced by) the corresponding color hue Hcam_out (hue h') obtained through the calculation (linear interpolation) performed in step 84. Also, the input color JCh' obtained through the change is regarded as an output color at the grid point corresponding to the input color RGB as a processing target and is stored in the memory 14B while being associated with the input color RGB as a processing target. Step 90 is an example of a process performed by the hue correcting unit (see FIG. 2).

In step 92, it is determined whether all the CLUTs have been extracted as input colors RGB as processing targets. If a negative determination is made, the process returns to step 80, and steps 80 to 92 are repeated until a positive determination is made in step 92. Accordingly, corrected input colors JCh' in which the hue h has been changed of all the input colors as processing targets are stored in the memory 14B. When a positive determination is made in step 92, the hue correction process ends. The above-described process is an example of a process performed by the hue correcting unit according to the exemplary embodiment of the present invention.

With the above-described hue correction process, the color positioned on the input color gamut boundary in the CLUT is subjected to hue correction so as to be mapped to the "corresponding color" illustrated in FIG. 5C through color gamut mapping, as indicated as "reproduction color after hue correction" in FIG. 5C. This suppresses a great change in chroma (or lightness), caused by color gamut mapping, of a color (e.g., Y, B, or C) positioned at the vicinity of a portion where the chroma at a boundary position of the output color gamut sharply changes with respect to change in hue among the colors positioned on the input color gamut boundary, without changing the algorithm of color gamut mapping (process for mainly achieving correspondence of lightness and chroma in the output color gamut).

Figure 7A:
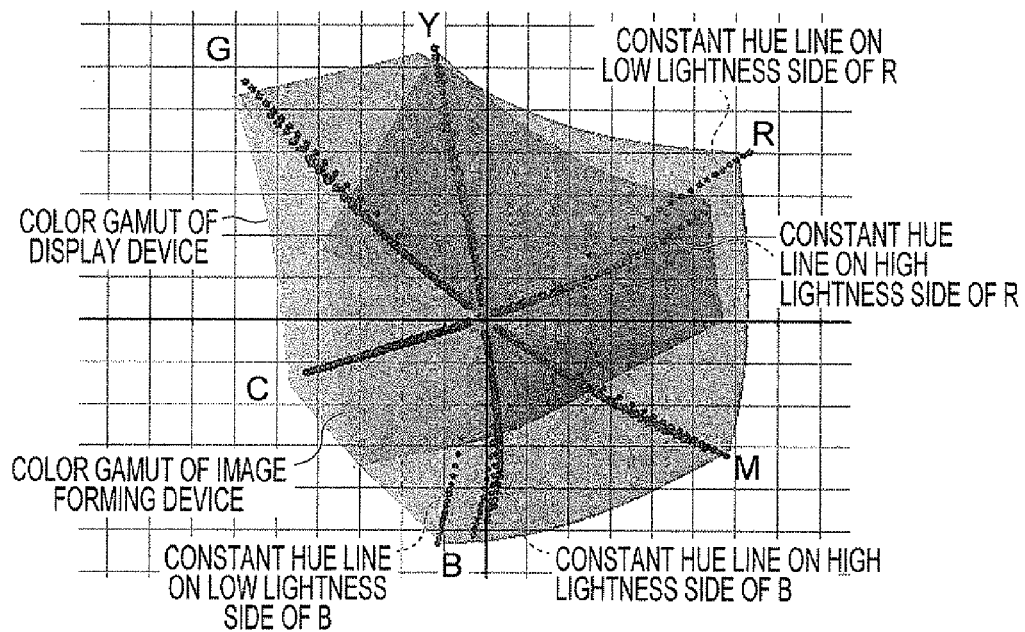
FIGS. 7A and 7B are schematic diagrams illustrating constant hue lines of input colors and constant hue lines after hue correction, respectively, in a device-independent color space.

As an example, FIG. 7A illustrates a typical color gamut of the display device 20 (more specifically, a result obtained by projecting a typical color gamut of the display device 20 onto a constant lightness plane (plane vertical to a lightness axis) in a device-independent color space). As is clear from FIG. 7A, in many display devices, a constant hue line that is a straight line in a device-dependent color space is curved in a device-independent color space. Particularly, regarding R and B, the degree of curve of the constant hue line on the high lightness side is relatively high, and the hue represented by the constant hue line on the high lightness side has a relatively great difference from the hue represented by the constant hue line on the low lightness side. That is, distortion of the hue is relatively large. The distortion of the hue is hardly visible as long as colors are displayed on the display screen of the display device 20.

However, if an output color gamut is apparently narrower than an input color gamut (FIG. 7A also illustrates a typical color gamut of an image forming device as an example of such an output color gamut) when the input colors existing in the color gamut of the display device (input color gamut) are to be mapped to the color gamut of another device (output color gamut), as in the color conversion processing unit according to this exemplary embodiment, the constant hue line curving in the device-independent color space illustrated in FIG. 8A as an example is bent in accordance with color gamut mapping, as illustrated in FIG. 8B as an example, so that a rapid change in hue or chroma occurs. The rapid change in hue or chroma expressed by this constant hue line is visually recognized as a great change in hue. Particularly, in an image of computer graphics or the like, the change in hue or chrome is remarkably recognized as deterioration of gradation reproducibility of the image.

Figure 7B:
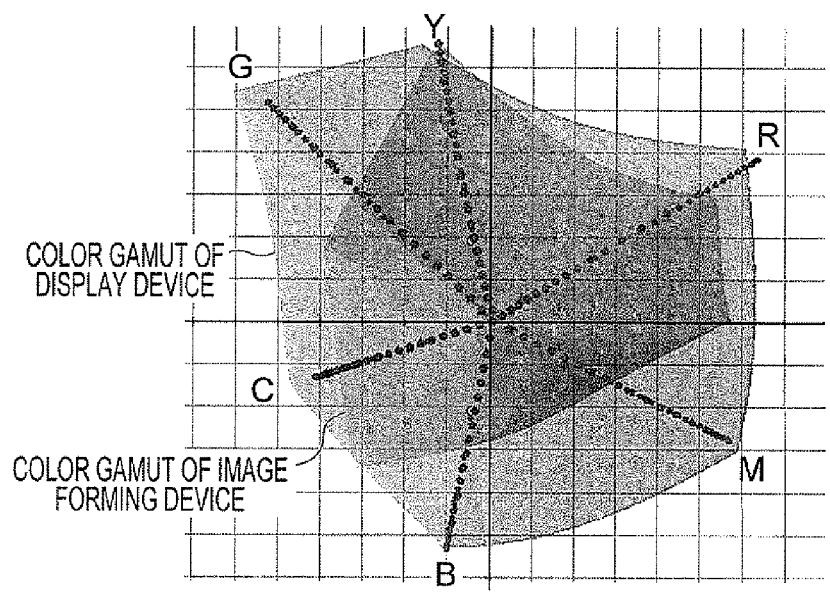

On the other hand, in the hue correction process according to the first exemplary embodiment, the device-dependent hue Hdev of a color represented by the input color RGB as a processing target of GLUT is calculated, the corresponding color hue Hcam_out (hue h') corresponding to the calculated device-dependent hue Hdev is calculated using linear interpolation on the basis of the correspondence between the device-dependent hue Hdev and the corresponding color hue Hcam_out indicated by the information registered in the hue control table, and the hue h of the input color JCh calculated from the input color RGB as a processing target is replaced by the hue h'. Thus, the corresponding color hues Hcam_out (hues h') calculated from the input colors having the same hue (the data forming a constant hue line) are equal to each other. Accordingly, as illustrated in FIG. 7B and FIG. 8C as an example, the hue h of the input color JCh is corrected so that the constant hue line curved in the device-independent color space becomes a straight line. This suppresses a rapid change in hue or chroma, causing the constant hue line to bend, in accordance with the execution of color gamut mapping in the subsequent stage, as illustrated in FIG. 8D as an example.

Also, in the CIELAB color space, which is widely used as one of device-independent color spaces, there is a difference between a color value in the color space and actual color appearance. Even if a hue is corrected so that a straight constant hue line is obtained in the CIELAB color space, fluctuation in hue is visually recognized in the gradation of the same color in an actual case. In this exemplary embodiment, the CIECAM02 color space is applied as a device-independent color space, and a hue is corrected so that a straight constant hue line is obtained in the CIECAM02 color space. Accordingly, the emergence of fluctuation of the hue in gradation of the same color is suppressed with higher accuracy.

Furthermore, a great change in chroma (or lightness) due to color gamut mapping or a rapid change in hue or chrome that affects a constant hue line may be suppressed by performing a simple process, that is, by obtaining corresponding color hues Hcam_out (hues h') for plural reproduction colors and registering them in the hue control table, and then correcting the hues of input colors on the basis of the information registered in the hue control table before performing color gamut mapping. Accordingly, the necessity for further changing a complicated algorithm of color gamut mapping is eliminated, and an arbitrary algorithm among various existing algorithms may be applied as the algorithm of color gamut mapping.

Second Exemplary Embodiment

Figure 9:
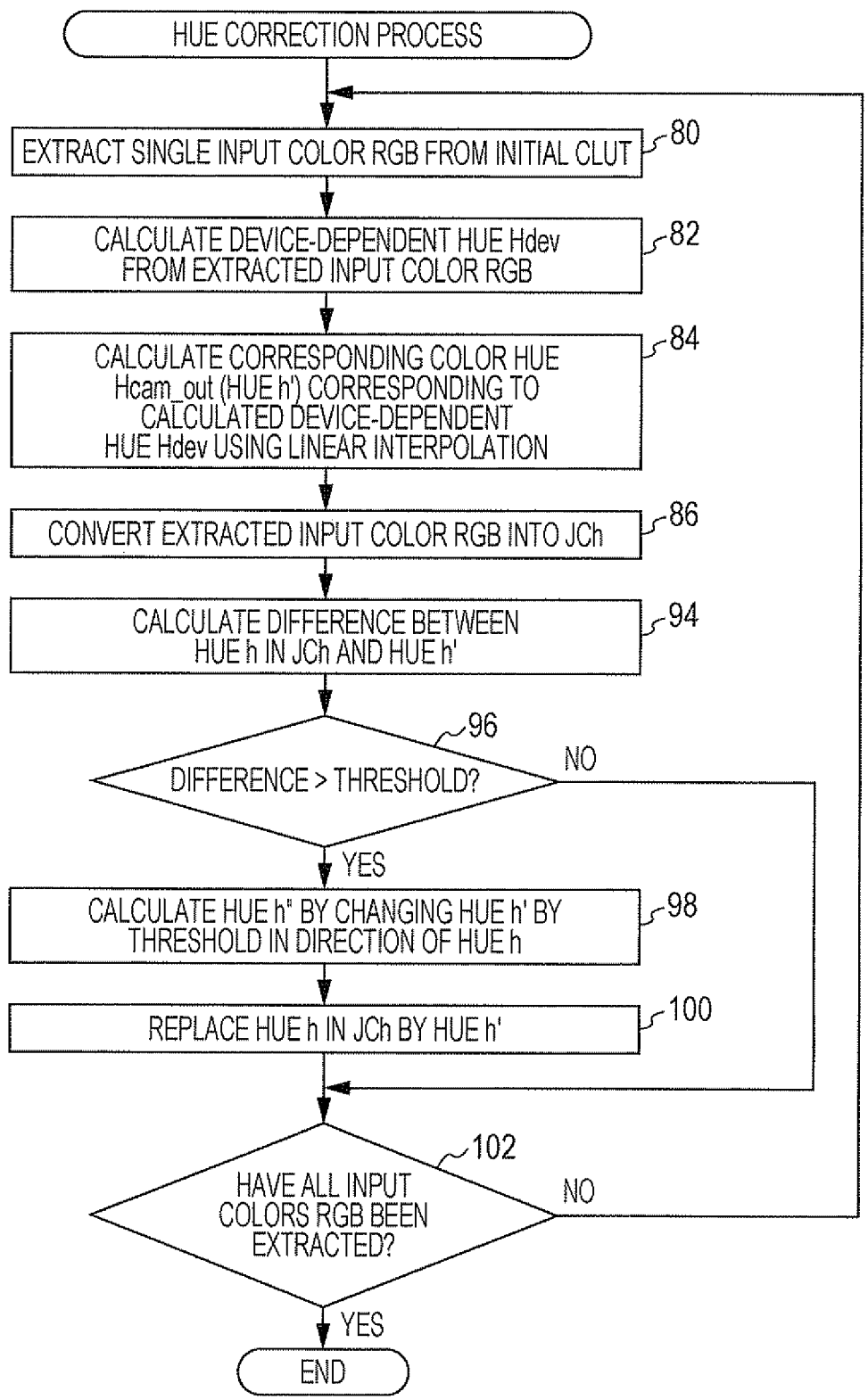
FIG. 9 is a flowchart illustrating a hue correction process according to a second exemplary embodiment of the present invention.

Next, a second exemplary embodiment of the present invention will be described. The second exemplary embodiment has the same configuration as that of the first exemplary embodiment. Thus, the same parts are denoted by the same reference numerals and the corresponding description will be omitted. Hereinafter, a hue correction process according to the second exemplary embodiment will be described with reference to FIG. 9. The description will be given of the part different from the hue correction process according to the first exemplary embodiment (FIG. 6).

In the hue correction process according to the second exemplary embodiment, as in the hue correction process according to the first exemplary embodiment (FIG. 6), a single input color RGB is extracted as a processing target (step 80), a device-dependent hue Hdev is calculated from the input color RGB as a processing target (step 82), a corresponding color hue Hcam_out (hue h') corresponding to the calculated device-dependent hue Hdev is calculated using linear interpolation on the basis of the correspondence between the device-dependent hue Hdev and the corresponding color hue Hcam_out indicated by the information registered in the hue control table (step 84), and an input color JCh is calculated from the input color RGB as a processing target (step 86). After that, in step 94, a difference between the hue h in the input color JCh obtained through the calculation performed in step 86 and the hue h' obtained through the calculation performed in step 84 is calculated.

The difference between the hue h and the hue h' may be a difference between the both hue angles or may be a vector distance in the CIECAM02 color space. In step 96, it is determined whether the difference obtained through the calculation performed in step 94 is larger than a predetermined threshold or not (an example of the threshold is illustrated in FIG. 8E). The threshold is not limited to a fixed value, and may be changed in accordance with chroma, or chroma and lightness.

If a positive determination is made in step 96, the process proceeds to step 98, where a hue h" is calculated by changing the hue h' obtained through the calculation performed in step 84 by the threshold in the direction of the hue h. In step 100, the hue h in the input color JCh obtained through the calculation performed in step 86 is changed to (replaced by) the hue h" obtained through the calculation performed in step 98. Then, the input color JCh" obtained through the change is stored in the memory 14B as an input color as a processing target in color gamut mapping, and the process proceeds to step 102.

On the other hand, if a negative determination is made in step 96 (if the difference between the hue h and the hue h' is equal to or smaller than the threshold), steps 98 and 100 are skipped, the input color JCh obtained through the calculation performed in step 86 is stored as is in the memory 14B as an input color as a processing target in color gamut mapping, and the process proceeds to step 102. Steps 94 to 100 according to the second exemplary embodiment correspond to the hue correcting unit of the color gamut mapping processing unit (see FIG. 2).

In step 102, it is determined whether all the CLUTs have been extracted as input colors RGB as processing targets. If a negative determination is made, the process returns to step 80, and steps 80 to 102 are repeated until a positive determination is made in step 102. Accordingly, as for the input colors in which the difference between the hue h and the hue h' is equal to or smaller than the threshold among the input colors as processing targets, the input color JCh obtained through the calculation from the input color RGB is stored in the memory 14B. As for the input colors in which the difference between the hue h and the hue h' is larger than the threshold, the input color JCh" is stored in the memory 14B. Then, when a positive determination is made in step 102, the hue correction process ends. The above-described hue correction process is an example of a process performed by the hue correcting unit described in the claims.

In the above-described hue correction process according to the second exemplary embodiment, as in the hue correction process according to the first exemplary embodiment (FIG. 6), the hue of a color on the input color gamut boundary in CLUT is substantially mapped to the "corresponding color" illustrated in FIG. 5C through color gamut mapping, as indicated as "reproduction color after hue correction" in FIG. 5C. Accordingly, a great change in chroma (or lightness), caused by color gamut mapping, of a color (e.g., Y, B, or C) positioned at the vicinity of a portion where the chroma at a boundary position of the output color gamut sharply changes with respect to change in hue among the colors positioned on the input color gamut boundary is suppressed without changing the algorithm of color gamut mapping for mainly performing chroma mapping.

In the hue correction process according to the first exemplary embodiment (FIG. 6), the hue of an input color is corrected so that a perceptual hue becomes constant. Regarding color processing, there may be a case where high priority is put on the condition "an output color is similar to an input color" or "there is no gradation jump of an output color" (e.g., a case where there is no high-chroma color in color data as a target of a color conversion process (color data that is converted by CLOT of the color conversion processing unit) or a case where a color similar to a color displayed on the display device 20 is to be reproduced in another device), in addition to a case where high priority is put on the condition "perceptual hue is constant".

On the other hand, in the hue correction process according to the second exemplary embodiment, the hue h in the input color JCh, which is obtained through calculation from the input color RGB, is replaced by the hue h", which is obtained by changing the hue h' by the threshold in the direction of the hue h, only in the grid point data of input colors in which the difference between the hue h and hue h' is larger than the threshold. On the other hand, in the grid point data in which the difference between the hue h and hue h' is equal to or smaller than the threshold, the input color JCh, which is obtained through calculation from the input color RGB, is used as is as an input color to be mapped. Therefore, as illustrated in FIG. 8E as an example, in the constant hue line that is curved in the device-independent color space, a hue difference with respect to the hue h' (device-independent hue Hcam) is suppressed to within the threshold, and the hue h in the input color JCh is corrected so that a constant hue line more similar to the original constant hue line (constant hue line curved in the device-independent color space) is obtained.

Accordingly, as illustrated in FIG. 8F as an example, bending of the constant hue line due to a rapid change in hue or chroma caused by the execution of color gamut mapping in the subsequent stage is suppressed compared to a case where hue correction is not performed. Also, as a result of the color conversion process using a color profile, output colors that are perceptually more similar to input colors may be obtained.

According to the description given above, a color that is positioned in an output color gamut in the device-independent color space, that has a hue difference of a threshold or smaller with respect to the hue in the device-independent color space (device-independent hue Hcam) of a reproduction color, and that has a minimum color difference with respect to the reproduction color in the device-independent color space or a minimum value of an evaluation function correlated with the color difference is regarded as a corresponding color corresponding to the reproduction color. Alternatively, the limit regarding the hue difference with respect to the device-independent hue Hcam may be eliminated, and a color that is positioned in an output color gamut in the device-independent color space and that has a minimum color difference with respect to the reproduction color in the device-independent color space or a minimum value of an evaluation function correlated with the color difference may be used as the corresponding color corresponding to the reproduction color. This exemplary embodiment is included in the scope of the claims.

Also, according to the description given above, the processing server 26 performs a hue control table generation process to generate a hue control table, but the embodiments of the present invention are not limited thereto. For example, a hue control table generated through a hue control table generation process performed by another computer or the like may be stored in advance in the storage unit 26C of the processing server 26.

Furthermore, according to the description given above, a color processing program according to an exemplary embodiment of the present invention is stored (installed) in advance in the storage unit 26C of the processing server 26. Alternatively, the color processing program may be provided in the form of being recorded on a recording medium, such as a compact disc read only memory (CD-ROM) or a digital versatile disc read only memory (DVD-ROM).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color processing device comprising:
a calculating unit that:
calculates hues in a device-dependent color space of an input side device; and
calculates hues in a device-independent color space of an output side device of a plurality of reproduction colors that are positioned on an input color gamut boundary and that have different hues;
a deriving unit that is configured to derive a correspondence between the hues in the device-dependent color space and the hues of the corresponding colors in the device-independent color space on the basis of the hues in the device-independent color space calculated by the calculating unit, by calculating, on the plurality of reproduction colors, individual hues of corresponding colors in which a determined difference in at least one of lightness and chroma caused by color gamut mapping performed in the device-independent color space is smaller than a determined difference caused by the color gamut mapping performed on the plurality of the reproduction colors;
a hue correcting unit that is configured to correct input colors so that hues in the device-independent color space of the input colors become similar to the hues of the corresponding colors in the device-independent color space corresponding to the hues in the device-dependent color space of the input colors obtained by calculating, using the correspondence derived by the deriving unit, hues in the device-dependent color space from the input colors; and
a color gamut mapping unit that performs the color gamut mapping in which the input colors corrected by the hue correcting unit are mapped into an output color gamut in the device-independent color space.

2. The color processing device according to claim 1, wherein the deriving unit calculates, as the hues of the corresponding colors, hues of colors that are positioned on a boundary of the output color gamut in the device-independent color space and that have a smallest color difference in the device-independent color space with respect to the reproduction colors or a smallest value of an evaluation function correlated with the color difference.

3. The color processing device according to claim 1, wherein the deriving unit calculates, as the hues of the corresponding colors, hues of colors in which a hue difference from the hues in the device-independent color space of the reproduction colors is equal to or smaller than a predetermined threshold.

4. The color processing device according to claim 1, wherein the hue correcting unit calculates the hues in the device-dependent color space and the hues in the device-independent color space from the input colors, then determines the amount of change from the hues in the device-independent color space of the input colors to the hues of the corresponding colors in the device-independent color space corresponding to the hues in the device-dependent color space of the input colors in accordance with a ratio of chroma in the device-independent color space of the reproduction colors and chroma in the device-independent color space of the input colors, and determines the hues of the corresponding colors on the basis of the determined amount of change.

5. The color processing device according to claim 2, wherein the hue correcting unit calculates the hues in the device-dependent color space and the hues in the device-independent color space from the input colors, then determines the amount of change from the hues in the device-independent color space of the input colors to the hues of the corresponding colors in the device-independent color space corresponding to the hues in the device-dependent color space of the input colors in accordance with a ratio of chroma in the device-independent color space of the reproduction colors and chroma in the device-independent color space of the input colors, and determines the hues of the corresponding colors on the basis of the determined amount of change.

6. The color processing device according to claim 3, wherein the hue correcting unit calculates the hues in the device-dependent color space and the hues in the device-independent color space from the input colors, then determines the amount of change from the hues in the device-independent color space of the input colors to the hues of the corresponding colors in the device-independent color space corresponding to the hues in the device-dependent color space of the input colors in accordance with a ratio of chroma in the device-independent color space of the reproduction colors and chroma in the device-independent color space of the input colors, and determines the hues of the corresponding colors on the basis of the determined amount of change.

7. The color processing device according to claim 1, wherein the hue correcting unit calculates the hues in the device-dependent color space and the hues in the device-independent color space from the input colors, calculates the hues of the corresponding colors in the device-independent color space corresponding to the hues in the device-dependent color space on the basis of the correspondence, and corrects input colors in which a difference between the hue in the device-independent color space and the hue of the corresponding color in the device-independent color space is larger than a predetermined threshold among the input colors so that the difference becomes equal to or smaller than the threshold.

8. The color processing device according to claim 2, wherein the hue correcting unit calculates the hues in the device-dependent color space and the hues in the device-independent color space from the input colors, calculates the hues of the corresponding colors in the device-independent color space corresponding to the hues in the device-dependent color space on the basis of the correspondence, and corrects input colors in which a difference between the hue in the device-independent color space and the hue of the corresponding color in the device-independent color space is larger than a predetermined threshold among the input colors so that the difference becomes equal to or smaller than the threshold.

9. The color processing device according to claim 3, wherein the hue correcting unit calculates the hues in the device-dependent color space and the hues in the device-independent color space from the input colors, calculates the hues of the corresponding colors in the device-independent color space corresponding to the hues in the device-dependent color space on the basis of the correspondence, and corrects input colors in which a difference between the hue in the device-independent color space and the hue of the corresponding color in the device-independent color space is larger than a predetermined threshold among the input colors so that the difference becomes equal to or smaller than the threshold.

10. A color processing method comprising:
- calculating hues in a device-dependent color space of an input side device;
- calculating hues in a device-independent color space of an output side device of a plurality of reproduction colors that are positioned on an input color gamut boundary and that have different hues;
- deriving a correspondence between the hues in the device-dependent color space and the hues of the corresponding colors in the device-independent color space, on the basis of the calculated hues in the device-independent color space, by calculating, on the plurality of reproduction colors, individual hues of corresponding colors in which a determined difference in at least one of lightness and chroma caused by color gamut mapping performed in the device-independent color space is smaller than a determined difference caused by the color gamut mapping performed on the reproduction colors;
- correcting the input colors so that hues in the device-independent color space of the input colors become similar to the hues of the corresponding colors in the device-independent color space corresponding to the hues in the device-dependent color space of the input colors obtained by calculating, using the correspondence derived by the deriving unit, hues in the device-dependent color space from input colors; and
- performing the color gamut mapping in which the corrected input colors are mapped into an output color gamut in the device-independent color space.

11. A non-transitory computer readable medium storing a program causing a computer to execute a process for processing colors, the process comprising:
- calculating hues in a device-dependent color space of an input side device;
- calculating hues in a device-independent color space of an output side device of a plurality of reproduction colors that are positioned on an input color gamut boundary and that have different hues;
- deriving a correspondence between the hues in the device-dependent color space and the hues of the corresponding colors in the device-independent color space, on the basis of the calculated hues in the device-independent color space, by calculating, on the plurality of reproduction colors, individual hues of corresponding colors in which a determined difference in at least one of lightness and chroma caused by color gamut mapping performed in the device-independent color space is smaller than a determined difference caused by the color gamut mapping performed on the reproduction colors;
- correcting the input colors so that hues in the device-independent color s ace of the input colors become similar to the hues of the corresponding colors in the device-independent colors space corresponding to the hues in the device-dependent color space of the input colors obtained by calculating, using the correspondence derived by the deriving unit, hues in the device-dependent color space from input colors; and
- performing the color gamut mapping in which the corrected input colors are mapped into an output color gamut in the device-independent color space.

* * * * *